| United States Patent | [15] | 3,681,472 |
|---|---|---|
| Jamison | [45] | Aug. 1, 1972 |

[54] SHAPED STRUCTURES

[72] Inventor: Saunders E. Jamison, Summit, N.J.

[73] Assignee: Celanese Corporation, New York, N.Y.

[22] Filed: March 10, 1971

[21] Appl. No.: 123,016

Related U.S. Application Data

[60] Division of Ser. No. 759,791, Sept. 13, 1968, which is a continuation of Ser. No. 611,468, Jan. 24, 1967, which is a continuation of Ser. No. 364,439, April 10, 1964, which is a division of Ser. No. 62,534, Oct. 4, 1968, Pat. No. 3,231,543.

[52] U.S. Cl. ............... 260/836, 260/13, 260/67 FP, 260/830 R, 260/837 R, 260/857 F, 260/860, 260/874, 264/184, 264/205

[51] Int. Cl. .................................................. C08g 45/04

[58] Field of Search ..................... 260/836, 874, 837

[56] References Cited

UNITED STATES PATENTS

| 3,182,038 | 5/1965 | Smoot | 260/836 |
| 3,310,608 | 3/1967 | Matsubayashi | 260/874 |
| 3,346,663 | 10/1967 | Kern | 260/874 |
| 3,485,910 | 12/1969 | Kennedy | 260/874 |

*Primary Examiner*—Paul Lieberman
*Attorney*—Thomas J. Morgan, Linn I. Grim and Martin J. Samuels

[57] ABSTRACT

This application discloses a process of preparing a self-supporting shaped structure which comprises polymerizing a solid phase monomer in the presence of a fluid catalyst. Specifically, trioxane is mixed with a resinous binder and then polymerized in the presence of boron fluoride. Also disclosed is the copolymerization of trioxane with diepoxides.

4 Claims, No Drawings

SHAPED STRUCTURES

This application is a divisional of my earlier copending application, Ser. No. 759,791, filed Sept. 13, 1968 which is a continuation in part of my earlier copending application, Ser. No. 611,468 filed Jan. 24, 1967, which is a continuation of Ser. No. 364,349, filed Apr. 10, 1964 which was in turn a division of my application Ser. No. 62,534, filed Oct. 4, 1960 which is now U.S. Pat. No. 3,231,543.

This invention relates to shaped, self-supporting structures extended in no more than two dimensions and to processes for making such structures from solidifiable monomers.

Synthetic fibrous materials are commonly prepared by the extrusion of a resinous material through a spinning orifice followed by solidification of the extruded stream by cooling, evaporation or coagulation. Synthetic films may be similarly prepared except that extrusion is through a die slit rather than a spinning orifice. Some resinous materials, however, are not readily extrudable except at relatively high temperatures and tend to degrade at such temperatures.

It is an object of the present invention to produce fibrous material or self-supporting films by a process which avoids thermal degradation of the fiber or film forming polymer. Other objects will appear hereafter.

The object of this invention is achieved by a process for the formation of shaped, self-supporting structures extended in no more than two dimensions which comprises polymerizing a solid phase monomer in the form of said shaped, self-supporting structure in the presence of a fluid catalyst.

This invention is particularly applicable to the polymerization of trioxane and for convenience will be described with reference thereto.

In a preferred embodiment of this invention, trioxane is admixed uniformly with a resinous binder, extruded through a spinning orifice to form a stream and then polymerized in the presence of gasiform boron fluoride after solidification of the stream. Solidification of the stream to a self-supporting structure makes the invention applicable to monomers which cannot be polymerized instantaneously.

The resinous binder serves the dual function of increasing the viscosity of the trioxane to permit it to be extruded in a fine stream and of maintaining the trioxane in a fibrous structure while polymerization takes place.

In most cases, it is desired to eliminate the resinous binder after polymerization is complete so that the fibrous residue will have the character of the oxymethylene polymer. This may be achieved by the selection of a resinous binder which is selectively soluble in a liquid solvent which is relatively ineffective as a solvent for the oxymethylene polymer. Or it may be achieved by the selection of a resinous binder which depolymerized under the trioxane polymerization conditions so that it disappears after lending its structure to the polymerization process.

When an oxymethylene polymer fiber is desired, the resinous binder is blended with trioxane in proportions between about 5 and 50 weight percent, based on the weight of trioxane. The binder is preferably dissolved in molten trioxane before extrusion thereof through the spinning orifice. If desired, both the trioxane and the binder may be dissolved in a common solvent to form a viscous solution and the solution may be extruded through the spinning orifice.

Solidification of the extruded stream is by cooling in the case where no solvent is used and usually by cooling and evaporation where a solvent is used. Volatile solvents and mild evaporative conditions are used with trioxane to control the trioxane loss which would otherwise occur because of the high volatility of the trioxane.

In some cases wet spinning methods may be used wherein the solution is extruded into a non-solvent liquid, such as n-octane, as a coagulant. In such cases the filaments may be polymerized in the presence of a liquid phase catalyst, such as boron trifluoride in solution in the coagulant liquid. Alternatively, the filaments may be removed from their liquid coagulant environment before polymerization in the presence of a gasiform catalyst takes place.

Suitable resinous binders for trioxane include thermoplastic vinyl polymers such as polyvinyl acetate, polystyrene, polyvinyl chloride, polymethyl methacrylate, polyvinyl pyrrolidone, polyethyl acrylate and polyvinyl caprolactam; thermoplastic condensation polymers, such as relatively low melting polyamides and polyesters; and thermoplastic cellulosic derivatives, such as cellulose acetate and ethyl cellulose.

Polyacetaldehyde prepared by acid-catalyzed polymerization of acetaldehyde at its freezing point and of the formula

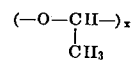

, is a useful binder since it depolymerizes readily when exposed to a trioxane polymerization catalyst under polymerization conditions.

The nature of the common solvents used when dry spinning is desired is dependent on the nature of the resinous binder. For many binders trioxane solvents such as methylene chloride or acetone are suitable. Suitable spinning compositions of this type include from 10 to 100 weight percent of binder and from 50 to 500 weight percent of solvent per unit weight of trioxane.

Spinning conditions depend upon the nature and proportion of the resinous binder and the nature and proportion of solvent if any. The spinning orifice diameter may vary as desired according to the product desired. Spinning temperatures from about 0° C. to about 100° C. are suitable for most spinning compositions.

After the extrusion operation is completed, the extruded stream is solidified, preferably by cooling or by cooling and evaporation. The atmosphere into which the spinning composition is extruded is preferably maintained at a temperature between about −50° C. and 50° C.

The preferred gasiform catalyst is boron trifluoride. It is preferably maintained in the atmosphere surrounding the solidified trioxane-binder filament at a concentration of from about 1 to 100 weight percent. Vaporizable acidic boron trifluoride complexes may also be used. A suitable catalyst environment may be maintained by passing nitrogen trrough a normally liquid boron trifluoride complex and thereafter into the polymerization zone. Suitable liquid phase catalysts include solutions of boron trifluoride or of acidic complexes of boron tri-fluoride in liquids, which are non-solvents for the trioxane and resinous binder under the polymerization conditions.

Polymerization temperatures are suitably between about −50° and 60° C. and the period of reaction may vary from about 12 hours to 1 minute. In most cases the catalytic environment is maintained just beyond the spinning orifice so that polymerization proceeds as soon as the extruded stream is solidified to a self-supporting structure. It is possible that polymerization is initiated to a minor extent before solidification but by far the greater portion of the trioxane solidifies before being polymerized.

In some cases, it may be desirable to prepare filamentary material having characteristics intermediate between those of the oxymethylene polymer and those of the resinous binder. In such cases the resinous binder is not removed after polymerization and the amount used depends upon the desired characteristics of the final product.

In another advantageous aspect of this invention a cross-linked polymeric structure may be prepared by the copolymerization of trioxane with a polyfunctional comonomer and particularly a polycyclic ether, such as a polyepoxide. This invention permits the utilization of such cross-linked copolymers since a useful filamentary material is produced by the polymerization reaction and there is no necessity for further shaping of the intractable polymer.

Suitable poly(1,2-epoxides) include those which may be prepared by the epoxidation of compounds having two or more olefinic linkages. Diepoxides of diolefins are usually used and the epoxidized olefinic bonds may be of aliphatic or cycloaliphatic structures.

Suitable poly(1,2-epoxides) also include polyglycidyl ethers of polyhydric alcohols, made by reacting a polyhydric alcohol and epichlorohydrin with an acidic catalyst such as boron trifluoride, and subsequently treating the resulting product with an alkaline material. Included among the polyhydric alcohols that can be used in the preparation of these polyepoxides are glycerine, ethylene glycol, propylene glycol, diethylene glycol, hexanetriol, pehtaerythritol, trimethylolethane, trimethylol-propane, etc. In addition, polyhydric ether alcohols, for instance diglycerol, dipentaerythritol, polyalkylene glycols and hydroxyalkyl ethers of the aforementioned polyhydric phenols can be used.

Particular diepoxides which may be used include

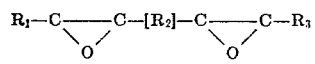

where $R_1$ and $R_3$ are selected from the group consisting of hydrogen; alkyl having from one to 20 carbon atoms; aryl having from six to 18 carbon atoms; aralkyl having from seven to 24 carbon atoms alkaryl having from seven to 24 carbon atoms; $(C)_r - O - (R_4) - O - (C)_s$; and

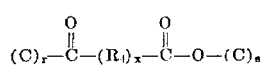

where $R_4$ is selected from the group consisting of alkyl having from two to 20 carbon atoms, aryl having from six to 18 carbon atoms, aralkyl having from seven to 24 carbon atoms and alkaryl having from seven to 24 carbon atoms and $x$ is 0 or 1 and $r$ and $s$ are integers between 1 and 10.

Suitable diepoxides include butadiene dioxide,

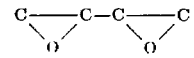

1,2,3,4-pentadiene dioxide; 1,2,4,5-pentadiene dioxide; 1,2,5,6-hexadiene dioxide; 1,2,3,4-hexadiene dioxide; 1,2,6,7-heptadiene dioxide; 1,2,7,8-octadiene dioxide; etc.; diglycidyl oxalate,

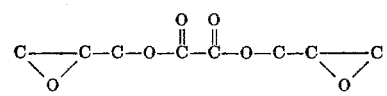

diglycidyl malonate; diglycidyl succinate; diglycidyl glutarate; diglycidyl adipate; diglycidyl pimelate; diglycidyl suberate; diglycidyl azelate; diglycidyl sebacate; etc.; ethylene glycol diglycidyl ether,

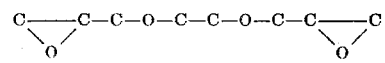

1,3-propanediol diglycidyl ether; 1,4-butanediol diglycidyl ether; 1,5-pentanediol diglycidyl ether; 1,2-hexanediol diglycidyl ether; etc. Other suitable diepoxides include vinyl cyclohexene dioxide (1-epoxyethyl-3,4-epoxy cyclohexane); limonene dioxide; dicyclopentadiene dioxide, bis-epoxydicyclopentyl ether of ethylene glycol; dipentene dioxide; dicryotylidene pentaerythritol diepoxide; etc.

Additional epoxides include glycidyl ethers of polyhydric phenols obtained by reacting a polyhydric phenol in an excess of epichlorohydrin with sodium hydroxide. Such polyhydric phenols include bisphenol A (p,p'-dihydroxydiphenyl propane), resorcinol, hydroquinone, 4,4'-dihydroxy benzophenone, bis(4-hydroxyphenyl ethane),1,5-dihydroxynaphthalene, 4,4'-dihydroxy biphenyl, novolak resins containing more than 2 phenol moieties linked through methylene bridges, and the like.

Among the suitable polyepoxides which may be used are the diepoxides of hydrocarbon dienes, such as vinyl cyclohexene dioxide and dicyclopentadiene dioxide; and diepoxides of substituted hydrocarbon dienes, such as 3,4-epoxy-6-methylcyclohexylmethyl 3,4-epoxy-6-methyl-cyclohexanecarboxylate. Polymeric epoxides, such as the epoxy resins produced by the reaction of epichlorohydrin with a bisphenol may also be copolymerized with trioxane by the method of this invention. Other polycyclic ethers include diketals and diacetals of pentaerythritol and dioxetanes formed from pentaerythritol and its derivatives. It may be noted that polyvinyl pyrrolidone and polyvinyl caprolactam, mentioned above as resinous binders are also polyfunctional comonomers capable of interaction with trioxane in a copolymerization.

The polycyclic ethers are suitably blended into the spinning compositions in proportions between about 10 and 50 weight percent, based on the weight of trioxnne. Spinning and polymerization conditions are as described above.

In the copolymerization reaction, trioxane rings open to produce short chains of three oxymethylene units and the epoxy rings open to produce substituted oxyethylene units. These units link up to form a space polymer comprising chains of oxymethylene units interspersed with oxyethylene units said chain being cross linked across carbon atoms of said oxyethylene units.

While the invention has been described with respect to the polymerization of spun structures, it is to be understood that other fibrous structures may be polymerized. For example, filaments may be prepared by drawing the viscous mixture from a softened and sticky melt thereof. Fibrous trioxane strands may also be be prepared by sublimation under carefully controlled conditions, as described below in Example I. While it is preferred to polymerize filamentary monomer other fibrous forms of monomer may be polymerized. Fibrous monomers having an extended dimension of at least 100 times the other two dimensions are suitable. Similarly monomers in film structures wherein each extended dimension is at least 100 times the thickness are suitable.

If desired, the trioxane may be copolymerized with from 0.4 to 40 weight percent of ethylene oxide or dioxolane. Such copolymers have greater thermal stability than homopolymers. Since the shaping of the polymer after its formation is not required, in accordance with this invention, high thermal stability is often not essential. But where it is desired such copolymers may be prepared by forming filaments from a mixture of trioxane, comonomer and binder and polymerizing as described above.

While the invention has been described with reference to the polymerization of trioxane, the general technique is also applicable to other normally solid or solidifiable monomers. The technique is particularly applicable to cationically catalyzed vinyl monomers and to cyclic compounds in which at least one ring bond is highly polarizable because of the presence of an electro-negative heteroatom. Examples of the cyclic compounds include other cyclic ethers, lactones, acetals, ketals, sulfides, imines and lactams. Examples of vinyl monomers include olefins, cycloolefins, vinyl ethers and acrylic acid derivatives. It is preferred that the monomer have a molecular weight not higher than about 300.

EXAMPLE I

A fibrous sublimate of trioxane was prepared by a sequence of two condensation operations. In the first, molten trioxane was heated in a vessel covered with a watch-glass in such a manner that the trioxane vaporized in the vessel and condensed as a closely packed snow on the under surface (convex) of the watch glass. The temperature of the watch glass could not rise above the melting point of trioxane (64° C.) for the condensation. The watch glass was cooled, by directing a cool air stream on the upper (concave) surface of the watch glass. Satisfactory rates of collection were maintained without boiling the trioxane (heating range 80°–110° C.).

In the second condensation the watch glass with the trioxane "snow" attached to its lower (convex) surface was placed over another vessel which was kept cool (room temperature). A stream of warm air (55°–60° C.) was directed at the upper (concave) surface of the watch glass so as to heat the trioxane without melting it. The trioxane then sublimed downward into the vessel where it formed a voluminous fibrous network.

A portion of the above-described fibrous mass was inserted into a stoppered test tube and sufficient boron trifluoride to provide a concentration in the test tube of 3 volume percent was thereafter introduced. The tube was maintained at 25° C. for a period of 150 minutes. The contents of the tube were then washed with acetone to remove unreacted trioxane and boron trifluoride. The polyoxymethylene fibers corresponded in weight to 71 percent of the trioxane starting material.

EXAMPLE II

A 25 percent solution of polyvinyl acetate in trioxane was extruded at 90° C. through a 2.0 mm orifice into a chamber held at −50° C. from which it was taken up at room temperature on glass tube. The filaments thus prepared were exposed for 30 minutes in a test tube at room temperature to an atmosphere of dry nitrogen containing about 20 volume percent of boron trifluoride. After exposure the filament was washed extensively with warm water to remove unreacted trioxane. Analysis showed that the filament had a composition of 47 percent polyoxymethylene and 53 percent polyvinyl acetate.

EXAMPLE III

Polyacetaldehyde was obtained by polymerizing acetaldehyde at its freezing point (−123.5° C.). Acetaldehyde (392 parts by weight) was distilled into a cold trap maintained at its freezing point and containing 0.22 parts of boric acid. Upon completion of the distillation, 1.45 parts of polymer was recovered having an inherent viscosity of 3.0 (0.1 percent solution in acetone at 25° C.).

Strands were drawn with a glass rod from a 10 percent solution of this polyacetaldehyde in trioxane. The strands were exposed at room temperature for 30 minutes to an atmosphere of 100 volume percent of boron trifluoride. After washing with water, analysis showed that the polymer filaments were pure polyoxymethylene.

EXAMPLE IV – XI

Strands were drawn with a glass rod from a solution (at 75°–80° C.) consisting of 10 parts of trioxane, 2.5 parts of polyvinyl acetate and 1 part of diepoxide of the group listed below. The strands were exposed at room temperature to boron trifluoride in concentrations ranging from 13 to 100 percent by volume (in nitrogen) for periods of two hours at room temperature. The material was then washed with boiling dimethylformanide to remove all material other than the crosslinked polymer. The results are shown in Table I, below.

| Example | Diepoxide | Volume % BF3 | Wt. % lene in Copolymer |
|---|---|---|---|
| IV | Vinyl cyclohexene dioxide | 13 | 45 |
| V | Vinyl cyclohexene dioxide | 27 | 46 |
| VI | Vinyl cyclohexene dioxide | 100 | 42 |
| VII | Dicyclopentadiene dioxide | 27 | 52 |
| VIII | Dicyclopentadiene dioxide | 100 | 55 |
| IX | (a) | 13 | 49 |
| X | (a) | 27 | 48 |
| XI | (a) | 100 | 49 | a. 3,4-epoxy-6-methyl-cyclohexylenethyl-3,4-epoxy-6-methyl-cyclohexanecarboxylate.

It is to be understood that the foregoing detailed description is given merely by way of illustration and that many variations may be made therein without departing from the spirit of my invention.

Having described my invention, what I desire to secure by Letters Patent is:

1. A composition comprising a uniform admixture of trioxane and between about 5 and 50 weight percent of polyvinylacetate and between about 10 and 50 weight percent of a diepoxide selected from the group consisting of vinyl cyclohexene dioxide, dicyclopentadienex dioxide, and 3,4-epoxy-6methyl cyclohexylmethyl3,4-epoxy-6-cyclohexanecarboxylate based upon the weight of said trioxane.

2. The composition of claim 1 wherein the admixture is in the form of a shaped self-supporting structure.

3. The composition of claim 1 wherein said polymeric binder is dissolved in molten trioxane.

4. The composition of claim 1 wherein said trioxane and said polymeric binder are dissolved in a common solvent to form a viscous extrudable composition.

* * * * *